US010110666B2

(12) United States Patent
Flynn, III et al.

(10) Patent No.: US 10,110,666 B2
(45) Date of Patent: Oct. 23, 2018

(54) SYSTEMS AND METHODS FOR INTERACTIVE MEDIA CONTENT EXCHANGE

(71) Applicant: Facebook, Inc., Menlo Park, CA (US)

(72) Inventors: William Joseph Flynn, III, San Francisco, CA (US); William M. Ruben, San Francisco, CA (US); Daniel James Smith, II, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/358,122

(22) Filed: Nov. 21, 2016

(65) Prior Publication Data

US 2017/0078370 A1   Mar. 16, 2017

Related U.S. Application Data

(63) Continuation of application No. 14/244,681, filed on Apr. 3, 2014, now Pat. No. 9,537,934.

(51) Int. Cl.
*H04L 29/08* (2006.01)
*G06Q 50/00* (2012.01)
*G06Q 10/10* (2012.01)

(52) U.S. Cl.
CPC ............ *H04L 67/10* (2013.01); *G06Q 10/10* (2013.01); *G06Q 50/01* (2013.01); *H04L 67/306* (2013.01)

(58) Field of Classification Search
CPC ...................................................... H04L 67/10
See application file for complete search history.

(56) References Cited

U.S. PATENT DOCUMENTS 5,276,437 A   1/1994  Horvath
5,680,719 A  10/1997  Poser
(Continued)

FOREIGN PATENT DOCUMENTS

JP   2005-236964   9/2005
JP   2014-044727   3/2014
(Continued)

OTHER PUBLICATIONS

Merriam-Webster, "processor", 2014.*
(Continued)

*Primary Examiner* — Ondrej C Vostal
(74) *Attorney, Agent, or Firm* — Sheppard Mullin Richter & Hampton LLP

(57) ABSTRACT

Systems, methods, and non-transitory computer-readable media can cause a first computing system to receive an obscured version of a first media content item from a second computing system. Access to the obscured version of the first media content item can be provided by the first computing system. Access to an unobscured version of the first media content item can be prevented by the first computing system. An unobscured version of a second media content item can be acquired by the first computing system using at least one sensor. The first computing system can transmit to the second computing system at least one of the unobscured version of the second media content item or an obscured version of the second media content item generated based on the unobscured version. Access to the unobscured version of the first media content item can be provided by the first computing system.

17 Claims, 12 Drawing Sheets

(56) References Cited

U.S. PATENT DOCUMENTS

| | | | |
|---|---|---|---|
| 6,118,872 A | 9/2000 | Kashima | |
| 6,728,763 B1* | 4/2004 | Chen | G06F 17/30902 370/316 |
| 6,847,719 B1 | 1/2005 | Ballard | |
| 6,993,508 B1* | 1/2006 | Major | G06F 21/10 380/211 |
| 7,003,546 B1 | 2/2006 | Cheah | |
| 7,433,930 B2 | 10/2008 | Fenizia | |
| 7,639,943 B1 | 12/2009 | Kalajan | |
| 7,721,103 B2 | 5/2010 | Risan | |
| 8,068,637 B2* | 11/2011 | Allen | H04N 1/00127 348/211.11 |
| 8,131,646 B2 | 3/2012 | Kocher | |
| 8,135,947 B1 | 3/2012 | Evans | |
| 8,190,700 B2* | 5/2012 | Herrmann | A63F 13/338 463/16 |
| 8,375,118 B2 | 2/2013 | Hao | |
| 2002/0066033 A1* | 5/2002 | Dobbins | G06Q 30/0277 726/4 |
| 2003/0140232 A1 | 7/2003 | De Lanauze | |
| 2004/0049598 A1* | 3/2004 | Tucker | G06F 17/30899 709/246 |
| 2004/0175098 A1* | 9/2004 | Calhoon | H04N 1/00127 386/231 |
| 2005/0039136 A1* | 2/2005 | Othmer | G06F 17/30905 715/774 |
| 2005/0114272 A1* | 5/2005 | Herrmann | G06Q 20/3674 705/67 |
| 2005/0144136 A1 | 6/2005 | Murashita | |
| 2005/0162965 A1* | 7/2005 | Fukuda | G06F 21/36 365/230.03 |
| 2005/0177624 A1 | 8/2005 | Oswald | |
| 2006/0072144 A1 | 4/2006 | Dowling | |
| 2006/0122946 A1* | 6/2006 | Fahrny | G06Q 20/3829 705/71 |
| 2006/0174026 A1* | 8/2006 | Robinson | H04N 7/17336 709/231 |
| 2007/0083473 A1* | 4/2007 | Farrugia | G06F 21/10 705/57 |
| 2007/0150963 A1 | 6/2007 | Lee | |
| 2007/0153910 A1* | 7/2007 | Levett | H04L 29/06027 375/240.25 |
| 2007/0171973 A1* | 7/2007 | Kobayashi | H04N 5/232 375/240.12 |
| 2007/0276926 A1* | 11/2007 | LaJoie | G06F 21/10 709/219 |
| 2007/0283381 A1* | 12/2007 | Sidi | H04N 5/4401 725/32 |
| 2008/0126810 A1 | 5/2008 | Chiu | |
| 2008/0137756 A1* | 6/2008 | Scherlis | H04N 21/235 375/240.28 |
| 2008/0141033 A1 | 6/2008 | Ginter | |
| 2008/0177994 A1 | 7/2008 | Mayer | |
| 2008/0189625 A1* | 8/2008 | Zuta | H04N 1/32128 715/753 |
| 2008/0215491 A1* | 9/2008 | Miller | G06Q 30/06 705/59 |
| 2008/0250239 A1 | 10/2008 | Risan | |
| 2008/0298571 A1 | 12/2008 | Kurtz | |
| 2009/0010503 A1 | 1/2009 | Mathiassen | |
| 2009/0117883 A1 | 5/2009 | Coffing | |
| 2010/0017326 A1* | 1/2010 | Hopkins | G06Q 20/105 705/41 |
| 2010/0082831 A1 | 4/2010 | Hans | |
| 2011/0019816 A1 | 1/2011 | Inami | |
| 2011/0302663 A1* | 12/2011 | Prodan | G06Q 20/10 726/30 |
| 2012/0036147 A1 | 2/2012 | Borst | |
| 2012/0066754 A1 | 3/2012 | Karaoguz | |
| 2012/0110121 A1 | 5/2012 | Flitcroft | |
| 2012/0130913 A1* | 5/2012 | Barrett | G06Q 30/018 705/317 |
| 2012/0284782 A1 | 11/2012 | Karim | |
| 2013/0013683 A1 | 1/2013 | Elliott | |
| 2013/0054837 A1* | 2/2013 | von Elgg | H04L 65/4084 709/247 |
| 2013/0092032 A1* | 4/2013 | Cafferty | F24C 7/08 99/325 |
| 2013/0173714 A1* | 7/2013 | D'Amore | H04L 67/22 709/205 |
| 2013/0173718 A1 | 7/2013 | Bhat | |
| 2013/0185333 A1 | 7/2013 | Shoemaker | |
| 2013/0239031 A1 | 9/2013 | Ubillos | |
| 2013/0263227 A1 | 10/2013 | Gongaware | |
| 2013/0318204 A1 | 11/2013 | Bennett | |
| 2013/0329777 A1* | 12/2013 | Konda | H04L 67/04 375/240.01 |
| 2013/0345326 A1* | 12/2013 | Bashir | C07C 1/04 518/704 |
| 2013/0346326 A1* | 12/2013 | Barrett | G06Q 30/018 705/317 |
| 2014/0032924 A1 | 1/2014 | Durham | |
| 2014/0050419 A1* | 2/2014 | Lerios | G06T 3/0056 382/276 |
| 2014/0055552 A1 | 2/2014 | Song | |
| 2014/0085487 A1* | 3/2014 | Park | G06F 3/04883 348/207.1 |
| 2014/0115330 A1* | 4/2014 | Chen | H04L 63/18 713/166 |
| 2014/0137204 A1 | 5/2014 | Vitzthum | |
| 2014/0172557 A1 | 6/2014 | Eden | |
| 2014/0185499 A1* | 7/2014 | Ray | H04W 84/18 370/310 |
| 2014/0233585 A1* | 8/2014 | Beers | H04L 49/254 370/431 |
| 2014/0289530 A1* | 9/2014 | De Waal | H04L 63/08 713/171 |
| 2014/0359272 A1 | 12/2014 | Hiltunen | |
| 2014/0380387 A1* | 12/2014 | Pattan | H04L 65/605 725/109 |
| 2015/0104012 A1 | 4/2015 | Holman | |
| 2015/0104013 A1 | 4/2015 | Holman | |
| 2015/0120800 A1* | 4/2015 | Yarvis | H04L 67/10 709/201 |
| 2015/0134739 A1* | 5/2015 | Gibbon | H04L 65/403 709/204 |
| 2015/0150147 A1 | 5/2015 | Keohane | |
| 2015/0163326 A1* | 6/2015 | Pan | H04L 69/04 709/217 |
| 2015/0249651 A1* | 9/2015 | Okamoto | H04L 63/08 713/171 |
| 2015/0332441 A1 | 11/2015 | Hogasten | |
| 2016/0037346 A1 | 2/2016 | Boettcher | |

FOREIGN PATENT DOCUMENTS

| | | |
|---|---|---|
| KR | 1020130020310 | 2/2013 |
| WO | 2007117730 | 10/2007 |
| WO | 2012001947 | 1/2012 |

OTHER PUBLICATIONS

Microsoft Computer Dictionary, "media", "multimedia", 5th edition, 2002, pp. 332 & 352.*

Cipperman Compliance Services LLC, "Advisors 'Pay-to-Pay' Rule 206(4)-5", 2013.*

US Securities and Exchange Commission, "Staff Responses to Questions About the Pay to Play Rule", 2017.*

Wikipedia, "Pay to Play", 2018.*

Merriam-Webster, "obscure", 2018 (Year: 2018).*

Japanese Patent Application No. 2016-559921, Office Action dated Mar. 27, 2018.

* cited by examiner

SYSTEMS AND METHODS FOR INTERACTIVE MEDIA CONTENT EXCHANGE

CROSS-REFERENCE TO RELATED APPLICATIONS

This application is a continuation of U.S. patent application Ser. No. 14/244,681, filed on Apr. 3, 2014 and entitled "SYSTEMS AND METHODS FOR INTERACTIVE MEDIA CONTENT EXCHANGE", which is incorporated herein by reference.

FIELD OF THE INVENTION

The present technology relates to the field of content sharing. More particularly, the present technology provides techniques for interactively exchanging media content.

BACKGROUND

The use of computing devices is becoming increasingly commonplace. Users of computing devices often browse web sites, access online content, interact with social networks, or perform a wide variety of tasks. Users can utilize computing devices to engage in communication. For example, under conventional approaches, a sending user can transmit a first text message to a recipient user. The recipient user can receive the first text message transmitted by the sending user. Upon receiving the first text message, the recipient user can view, read, access, or otherwise interact with the first text message. Moreover, the recipient user can decide to respond to the first text message by transmitting a second text message back to the original sending user. The original sending user can receive the second text message and can view, read, access, or otherwise interact with the second text message.

In another example, under conventional approaches, the sending user can transmit media content, such as images, audio, videos, and text, to the recipient. The recipient user can receive the media content and can access, view, or otherwise interact with the media content upon receipt. However, conventional approaches to communications can be uninteresting, boring, or not sufficiently interactive. These and other similar concerns can reduce or create challenges for the overall user experience associated with using computing devices to engage in communication.

SUMMARY

Various embodiments of the present disclosure can include systems, methods, and non-transitory computer readable media configured to cause a first computing system to receive an obscured version of a first media content item from a second computing system. Access to the obscured version of the first media content item can be provided by the first computing system. Access to an unobscured version of the first media content item can be prevented by the first computing system. Moreover, an unobscured version of a second media content item can be acquired by the first computing system using at least one sensor of the first computing system. The first computing system can transmit to the second computing system at least one of the unobscured version of the second media content item or an obscured version of the second media content item generated based on the unobscured version of the second media content item. Access to the unobscured version of the first media content item can be provided by the first computing system.

In one embodiment, the unobscured version of the first media content item can be received by the first computing system within an allowable time period from when the obscured version of the first media content item is received.

In one embodiment, a notification indicating that the obscured version of the first media content item is received from the second computing system can be presented by the first computing system. The notification can be presented before providing access to the obscured version of the first media content item but after the unobscured version of the first media content item is received.

In one embodiment, providing access to the unobscured version of the first media content item can be performed within an allowable time period from when the obscured version of the second media content item is transmitted to the second computing system.

In one embodiment, an obscured version of a third media content item can be received by the first computing system from a third computing system prior to transmitting the obscured version of the second media content item to the second computing system. Access to the obscured version of the third media content item can be provided by the first computing system. Access to an unobscured version of the third media content item can be prevented by the first computing system. The first computing system can transmit to the third computing system at least one of the unobscured version of the second media content item or the obscured version of the second media content item. Access to the unobscured version of the third media content item can be provided within an allowable time period from when the at least one of the unobscured version of the second media content item or the obscured version of the second media content item is transmitted to the third computing system.

In one embodiment, the obscured version of the first media content item can be received before the obscured version of the third media content item is received. Further, providing access to the obscured version of the first media content item can include displaying the obscured version of the first media content item at a first position on a display screen of the first computing system. Providing access to the obscured version of the third media content item can include displaying the obscured version of the third media content item in a second position above the first position.

In one embodiment, the obscured version of the first media content item can be received before the obscured version of the third media content item is received. Providing access to the unobscured version of the first media content item can include presenting, in a first layer of a virtual stack, a displayed representation of the unobscured version of the first media content item on a display screen of the first computing system. Moreover, providing access to the unobscured version of the third media content item can include presenting, in a second layer below the first layer in the virtual stack, a displayed representation of the unobscured version of the third media content item.

In one embodiment, at least one user interaction to move the displayed representation of the unobscured version of the first media content item presented in the first layer can be received. The displayed representation of the unobscured version of the first media content item can be moved based on one or more movements associated with the at least one user interaction.

In one embodiment, the one or more movements can be associated with at least one of a flicking gesture, a swiping gesture, a throwing gesture, or a tossing gesture. The displayed representation of the unobscured version of the first media content item can be moved off the display screen of first computing system. An instance of the unobscured version of the first media content item can be permanently removed from the first computing system. Further, the displayed representation of the unobscured version of the third media content item can be presented on the display screen in full view.

In one embodiment, each of the obscured version of the first media content item and the obscured version of the second media content item can include at least one of a pixelated media content item, a blurred media content item, a censored media content item, an obstructed media content item, a shrunken media content item, a watermarked media content item, or a visibly unclear media content item.

In one embodiment, the unobscured version of the second media content item can be modified before generating the obscured version of the second media content.

In one embodiment, modifying the unobscured version of the second media content item can be based on at least one of a drawing, a sticker, a stamp, an image filter, a photo effect, a visual crop, a playback edit (e.g., playback length trim, playback speed modification, etc.), a caption, or a tag.

In one embodiment, providing access to the obscured version of the first media content item can include providing access to data associated with the first media content item.

In one embodiment, the data associated with the first media content can include at least one of a caption, a tag, a property, metadata, or contextual information.

In one embodiment, the at least one sensor can include at least one of a front-facing camera or a rear-facing camera.

In one embodiment, one of the front-facing camera or the rear-facing camera can be selected, based on a user action, to be used for acquiring the unobscured version of the second media content. Moreover, the user action can be evaluated with respect to a digital button represented by text (e.g., "Selfie").

In one embodiment, providing access to the unobscured version of the first media content item can include presenting the unobscured version of the first media content item over time.

In one embodiment, each of the first media content item and the second media content item can include at least one of an image, a video, or a graphics interchange format (GIF).

Many other features and embodiments of the invention will be apparent from the accompanying drawings and from the following detailed description.

Figure 1A:
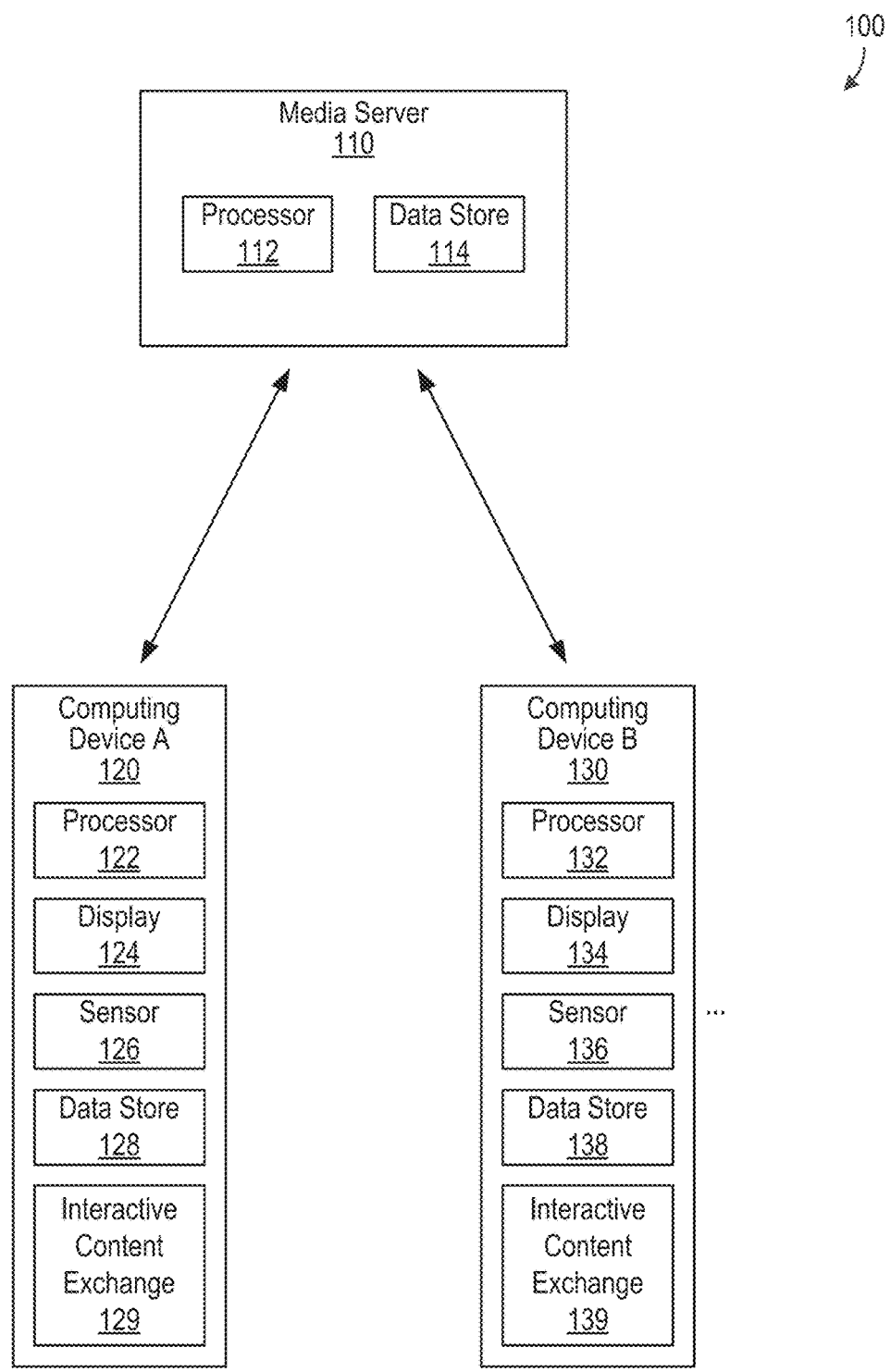
FIG. 1A illustrates an example system configured to provide for interactively exchanging media content, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Interactive Media Content Exchange

People often communicate or exchange information using computing devices (or systems). Conventional approaches to communicating via computing devices can include text messaging, such as short message service (SMS) and multimedia messaging service (MMS). For example, under conventional approaches, a first computing device can transmit a communication, including text, images, audio, and/or video, etc., to a second computing device over a cellular or local network. The second computing device can receive the communication and immediately (or almost immediately) view, access, or otherwise interact with the content included in the communication.

Content associated with these conventional approaches to communication can be considered as being provided for "free", in that the recipient of the content can access, view, or interact with the content upon receipt of the content without any significant effort. For example, when a recipient computing device receives an image, a user of the computing device can select, click, or tap on, etc., the image to view and/or download the image.

As such, conventional approaches generally involve a sending party creating or producing content, and then sending the created or produced content to a receiving party. The receiving party receives and consumes (e.g., uses, views, accesses, interacts with, etc.) the content. However, these and other similar types of conventional approaches to providing communications can be boring, uninteresting, and/or not sufficiently interactive. Various embodiments of the present disclosure can utilize computing devices (or systems) to provide for interactively exchanging media content.

FIG. 1A illustrates an example system 100 configured to provide for interactively exchanging media content, according to an embodiment of the present disclosure. The example system 100 can include a media server 110 and one or more computing devices (e.g., computing device A 120, computing device B 130, computer system 1000 in FIG. 10, etc.). In some embodiments, the media server 110 can comprise at least one processor 112 and at least one data store 114. The at least one processor 112 can be configured to facilitate performing various tasks of the media server 110. The at least one data store 114 can be configured to store various types of data and information, such as media content.

In the example of FIG. 1A, the one or more computing devices can include a first computing device (e.g., computing device A) 120 and a second computing device (e.g., computing device B) 130. Computing device A 120 can comprise at least one processor 122, at least one display 124, at least one sensor 126, and at least one data store 128. Similarly, computing device B 130 can also comprise at least one processor 132, at least one display 134, at least one sensor 136, and at least one data store 138. For each computing device (e.g., computing device A 120, computing device B 130, etc.), the at least one processor (e.g., processor 122, processor 132, etc.) can facilitate various operations of the respective device. Each of the display elements 124 and 134 can be configured to display or present visual content. Each of the sensors 126 and 136 can be configured to acquire, gather, determine, and/or detect data. In some cases, each of sensors 126 and 136 can include (but is not limited to) at least one of a touch sensor (e.g., touch display), an audio sensor (e.g., microphone), or an image sensor (e.g., camera), an accelerometer, a gyroscope, a locational sensor (e.g., GPS), etc. Moreover, the data stores 128 and 138 can be configured to store information associated with operations of the computing devices.

Various embodiments of the present disclosure can provide a "pay-to-play" approach to interactively sharing or exchanging content. For example, a recipient of content, which is included in a received communication, must "pay a cost" or exert some specified effort, such as by providing additional content in a reply to the received communication, in order to fully access the content in the received communication.

With reference to FIG. 1A, in some embodiments, an interactive content exchange module/component 129 included with computing device A 120 can cause computing device A 120 to acquire a first media content item (e.g., image, video, etc.) using the at least one sensor 126 (e.g., camera). For example, a user of computing device A 120 can initiate and utilize the interactive content exchange component 129 to cause a front-facing and/or rear-facing camera on computing device A 120 to take a photo or video. The acquired first media content item (e.g., photo, video, etc.) can correspond to an original, full resolution, and/or unobscured (e.g., substantially clear, unaltered, etc.) version of the first media content item. In some implementations, the interactive content exchange module 129 can cause computing device A 120 to generate an obscured (e.g., pixelated, blurred, censored, obstructed, shrunken, visibly unclear, etc.) version of the first media content item based on the unobscured version. In some implementations, the interactive content exchange module 129 can cause computing device A 120 to transmit the unobscured (and/or full resolution) version of the first media content item to the media server 110, and the media server 110 can generate the obscured version of the first media content item based on the unobscured version.

Furthermore, the interactive content exchange module 129 can cause computing device A 120 to transmit the obscured and unobscured versions of the first media content item to computing device B 130. In some embodiments, the transmission of the obscured and unobscured versions of the first media content item from computing device A 120 to computing device B 130 can be performed via the media server 110. For example, the media server 110 can relay communications, including content, between computing device A 120 and computing device B 130.

When computing device B 130 receives the obscured (e.g., pixelated, shrunken, etc.) and unobscured (e.g., substantially clear, full-resolution, etc.) versions of the first media content item, an interactive content exchange module/component 139 can enable computing device B 130 to provide access to the obscured version of the first media content item while preventing access to the unobscured version of the first media content item. The obscured version of the first media content item can correspond to a pixelated, shrunken, thumbnail preview of the unobscured (and/or full-resolution) version of the first content item. Often times, the obscured version can hook or grab the interest and/or attention of a user of computing device B 130, without permitting the user to access the unobscured (e.g., full-resolution, substantially clear, original, etc.) version of the first media content item. As such, the user of computing device B 130 might desire to see the unobscured version of the first media content item.

In order to access the unobscured version of the first media content item, the interactive content exchange module 139 can enable the user of computing device B 130 to utilize the at least one sensor 136 (e.g., front-facing camera, rear-facing camera, etc.) to acquire a second media content item (e.g., image, video, etc.), which can correspond to an unobscured (e.g., full-resolution, original, unaltered, etc.) version. The interactive content exchange module 139 can cause computing device B 130 (or media server 110) to generate an obscured version of the second media content item based on the unobscured version. The user of computing device B 130 can choose to send the unobscured and obscured versions of the second media content item back to computing device A 120 (e.g., via media server 110). In response to sending the second media content item to computing device A 120, the interactive content exchange module 139 can enable computing device B to provide access to the unobscured version of the first media content item. The process of receiving obscured content, sending content in a subsequent response, and then receiving access to unobscured content can repeat. For example, in order for the user of computing device A 120 to view the unobscured version of the second media content item, the user of computing device A 120 has to acquire and send a third media content item to computing device B 130 (or the user of computing device B 130).

Figure 1B:
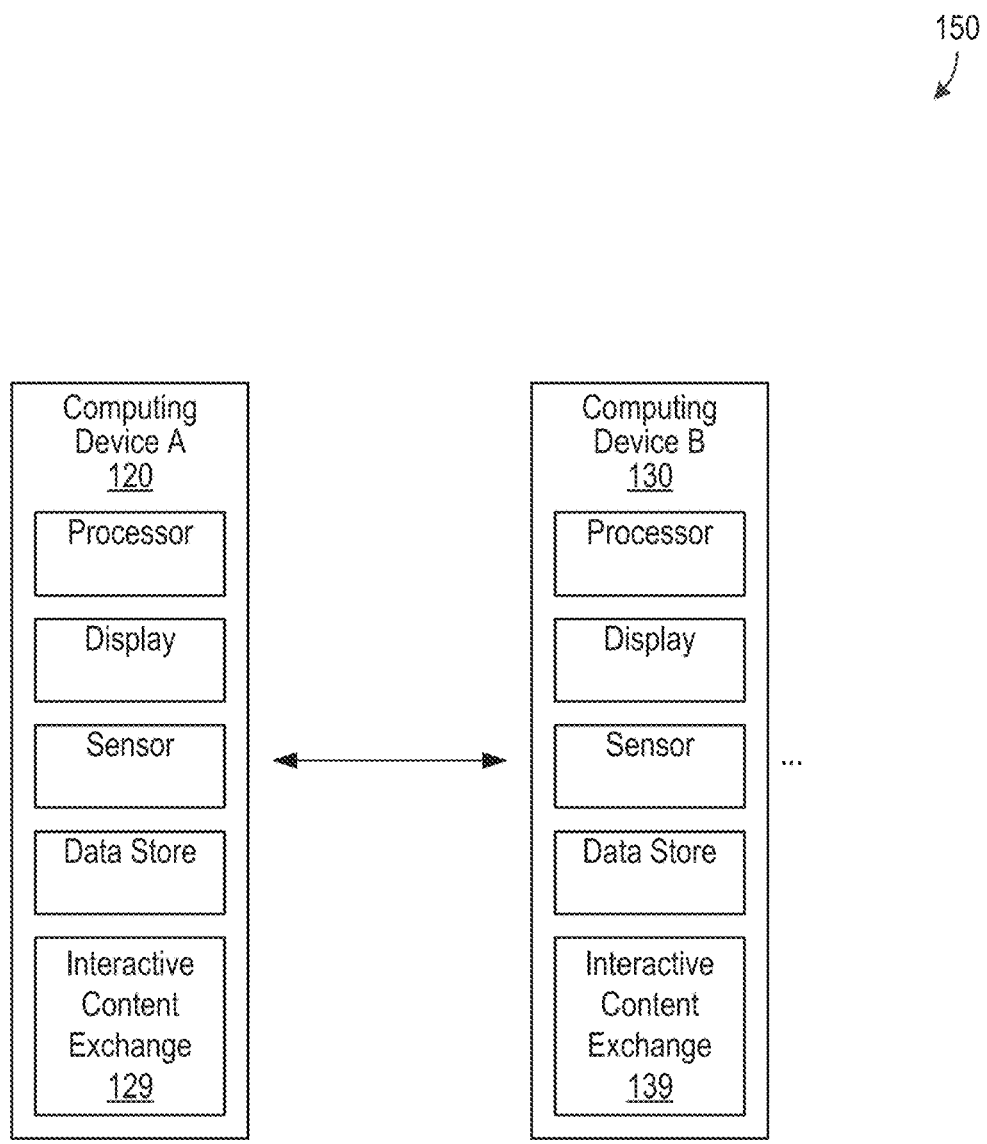
FIG. 1B illustrates an example system configured to provide for interactively exchanging media content, according to an embodiment of the present disclosure.

FIG. 1B illustrates an example system 150 configured to provide for interactively exchanging media content, according to an embodiment of the present disclosure. The example system 150 can include one or more computing devices such as computing device A 120 and computing device B 130. In some embodiments, multiple computing devices can be configured to communicate with one another. For example, as shown in FIG. 1B, computing device A 120 can communicate and exchange media content with computing device B 130 without necessarily depending on the media server 110 of FIG. 1A to relay information.

Accordingly, in some embodiments, the media server 110 of FIG. 1A can be optional. In one example scenario, the interactive content exchange component 129 can cause computing device A 120 to capture an original image, which can be at full-resolution and can be substantially clear. The interactive content exchange component 129 can cause computing device A 120 to apply one or more obscuring techniques to the original image to produce an obscured (e.g., pixelated, shrunken, etc.) version of the image. The interactive content exchange component 129 can further cause computing device A 120 to send the unobscured and obscured versions of the image to computing device B 130. Upon receipt of the unobscured and obscured versions of the image by computing device B, the interactive content exchange component 139 can cause computing device B 130 to provide access only to the obscured version of the image. In order to access the unobscured version of the image, computing device B 130 has to further acquire another image, obscure the other image, and transmit the unobscured and obscured versions of the other image back to computing device A 120. This process can repeat over time, resulting in a plurality of media content items being interactively exchanged in a "pay-to-play" manner.

Figure 2:
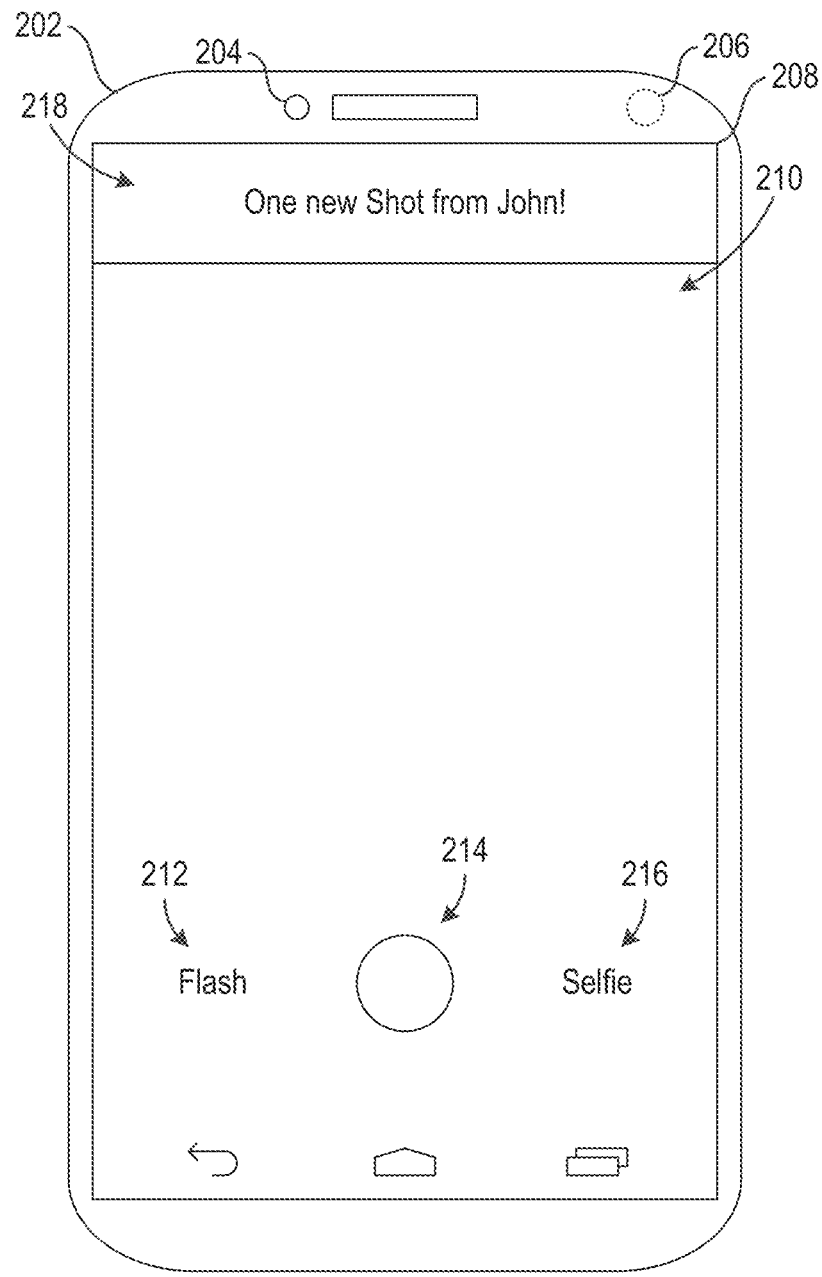
FIG. 2 illustrates an example computing device configured to provide for interactively exchanging media content, according to an embodiment of the present disclosure.

FIG. 2 illustrates an example computing device 202 configured to provide for interactively exchanging media content, according to an embodiment of the present disclosure. The example computing device 202 (e.g., computer system 1000 in FIG. 10) can comprise one or more sensors, such as a front-facing image sensor (e.g., front-facing camera) 204 and a rear-facing image sensor (e.g., rear-facing camera) 206. The example computing device 202 can also comprise a display element (e.g., display screen, touch screen, etc.) 208 configured to present visual content.

In some embodiments, the computing device 202 can be configured to run an interactive content exchange application. In some cases, the interactive content exchange application can be associated with an interactive content exchange component (e.g., interactive content exchange module 129 or interactive content exchange module 139 in FIG. 1A and FIG. 1B). In one example, the interactive content exchange application can initiate a camera mode. The camera mode can provide a view 210 of whatever imagery a selected camera (e.g., front-facing camera 204, rear-facing camera 206, etc.) currently "sees" or detects.

As shown in FIG. 2, the camera mode of the interactive content exchange application can provide various user interface elements including (but not limited to) an icon (or button) 212 for configuring flash, an icon 214 for recording, and an icon 216 for switching cameras. In some cases, the icon (or button) 212 for configuring flash can correspond to a text icon including the text "Flash". The icon 214 for recording can start and stop the recording of images or videos. In some cases, the icon 216 for switching cameras can correspond to a text icon including the text "Selfie", which can be a term that refers to a picture of oneself. In some implementations, pressing, tapping, or otherwise interacting with the "Selfie" icon or button 216 can switch the camera that is in currently use, for example, from the rear-facing camera 206 to the front-facing camera 204.

In one example, when a communication including an obscured media content item is received from another computing device, a notification 218 can be presented by the interactive content exchange application. In FIG. 2, the notification 218 can indicate that the communication, which can also be referred to as a "Shot", is received from a user named "Joe". In some cases, the notification 218 can be presented when both the obscured version and the unobscured version of the media content item have been received (e.g., completely downloaded). Continuing with the example, a user of the computing device 202 can tap on, click on, or otherwise interact with the notification 218 and/or device 202 in order to obtain more information about the communication (e.g., "Shot") from "Joe".

Figure 3:
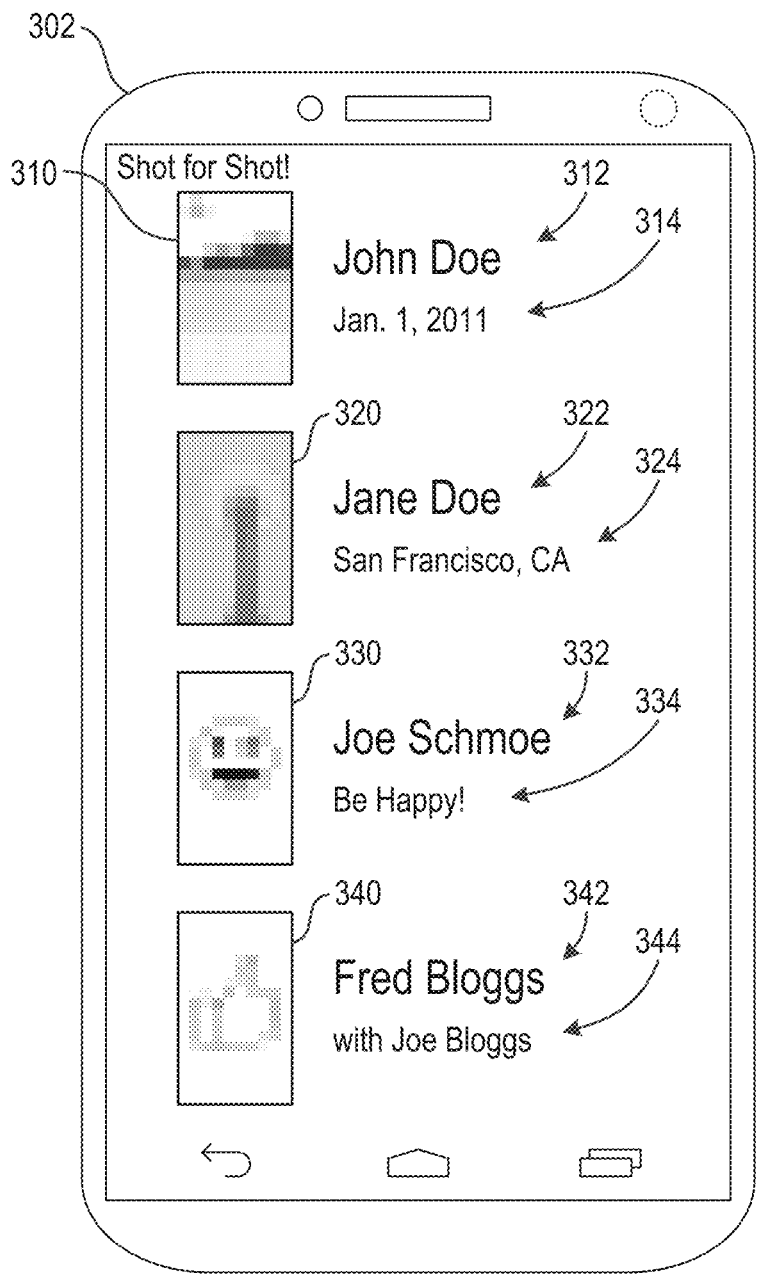
FIG. 3 illustrates an example computing device configured to provide for interactively exchanging media content, according to an embodiment of the present disclosure.

FIG. 3 illustrates an example computing device 302 (e.g., computer system 1000 in FIG. 10) configured to provide for interactively exchanging media content, according to an embodiment of the present disclosure. As discussed above with reference to FIG. 2, a user can interact with a notification, which indicates that a communication (e.g., "Shot") has been received, in order to obtain more information about the received communication. In FIG. 3, when the user interacts with the notification, the interactive content exchange application can display one or more received communications that have yet to be completely accessed by the user. These one or more received communications are not yet permitted to be completely accessible. These one or more received communications can, for example, include obscured versions of media content items that are accessible (e.g., viewable, displayable), as well as unobscured versions of the media content items that are not yet accessible. In some instances, these one or more received communications can be referred to as "outstanding Shots" or "new Shots".

In the example of FIG. 3, four outstanding Shots are shown. The outstanding Shots can, for example, be displayed or listed from most recently received to least recently received (or vice versa). In this example, the first outstanding Shot can include an obscured (e.g., pixelated) version 310 of a first media content item (e.g., image, video, etc.) received from John Doe 312. The first outstanding Shot can also be associated with metadata such as a date (or time) 314 when the first media content item (and/or the first outstanding Shot) was created.

The second outstanding Shot can include an obscured version 320 of a second media content item received from (or sent by) Jane Doe 322. The second outstanding Shot can include information indicating that the second media content item (and/or the second outstanding Shot) was created in a certain location (e.g., San Francisco, Calif. 324).

Continuing with the example of FIG. 3, the third outstanding Shot can include an obscured version 330 of a third media content item received from Joe Schmoe 332 and a caption (e.g., "Be Happy!" 334). Furthermore, the fourth outstanding Shot can include an obscured version 340 of a fourth media content item received from Fred Bloggs 342 and a tag 344 indicating that the fourth media content item (and/or the fourth outstanding Shot) is associated with Joe Bloggs.

In some embodiments, a Shot can be associated with other information including (but not limited to) a property, an identifier for a sending computing device that sent the Shot, a speed at which the sending computing device was moving or being moved when the Shot was created, an acceleration at which the sending computing device was undergoing when the Shot was created, a direction at which the sending computing device was pointing when the Shot was created, the weather conditions surrounding the sending computing device when the Shot was created, and/or a title of a media being accessed (e.g., a song being played) by the sending computing device when the Shot was created, etc.

As discussed above, the four outstanding Shots are not yet completely accessible. In other words, the user of the computing device 302 (or the interactive content exchange application running on the computing device 302) can only access or view the obscured (e.g., pixelated, shrunken, thumbnail, etc.) versions of the media content items of the outstanding Shots and cannot yet access the unobscured (e.g., unpixelated, enlarged, full-resolution, original, etc.) versions of the media content items. The obscured versions of the media content items can be intended to spark the user's interest in the media content items (e.g., such that the user would want to view the unobscured versions of the media content items). In order to access the unobscured versions, the user must create his or her own media content item(s) to be transmitted to the respective senders of the outstanding Shots.

Figure 4:
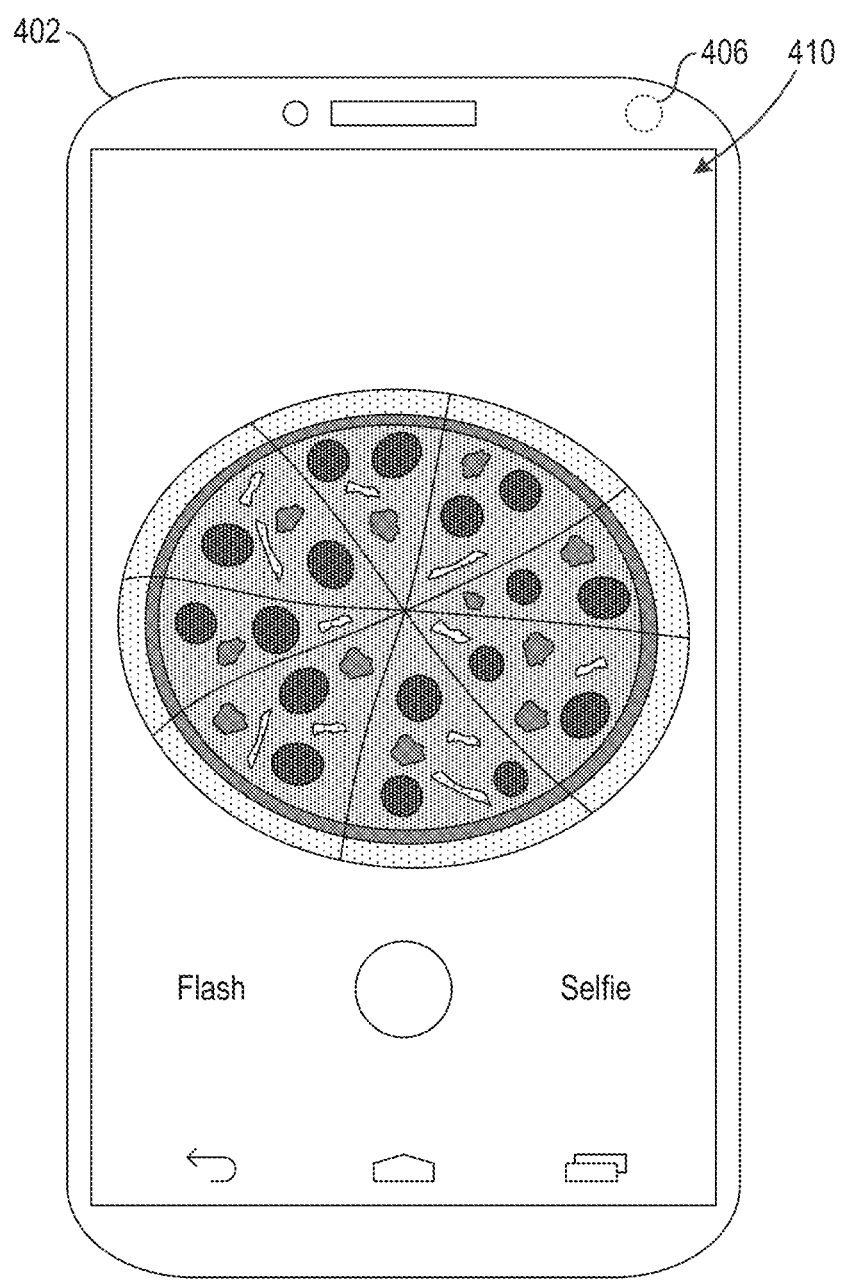
FIG. 4 illustrates an example computing device configured to provide for interactively exchanging media content, according to an embodiment of the present disclosure.

FIG. 4 illustrates an example computing device 402 (e.g., computer system 1000 in FIG. 10) configured to provide for interactively exchanging media content, according to an embodiment of the present disclosure. As discussed previously, in accordance with the "pay-to-play" approach to communications, in order to access (e.g., view, play, etc.) unobscured versions of media content items included in received communications (e.g., Shots), a user must produce or create his or her own media content item(s) to be transmitted to the respective senders of the received communications. As such, in order to access the unobscured versions of the media content items included with the outstanding Shots (as described with reference to FIG. 3), the user can activate the camera mode of the interactive content exchange application. The camera mode of the interactive content exchange application can enable the user to create his or her own media content item(s) to be transmitted to those who sent the outstanding Shots.

As shown in the example of FIG. 4, the computing device 402 running the interactive content exchange application can be operating in the camera mode. In this example, the user can be currently at a pizza eatery. The user can decide to create a media content item in the form of an image of a pizza. Using, for example, the rear-facing camera 406 on the computing device 402, the user can capture the image 410 of the pizza. The captured image 410 can correspond to an unobscured (e.g., full-resolution, unaltered, original, etc.) version of the image. In some embodiments, the computing device 402 can generate an obscured version of the image 410 based on the unobscured version. In some embodiments, the computing device 402 can provide the unobscured version to a remote server (e.g., media server 110 in FIG. 1A), where the obscured version can be generated based on the unobscured version.

Figure 5:
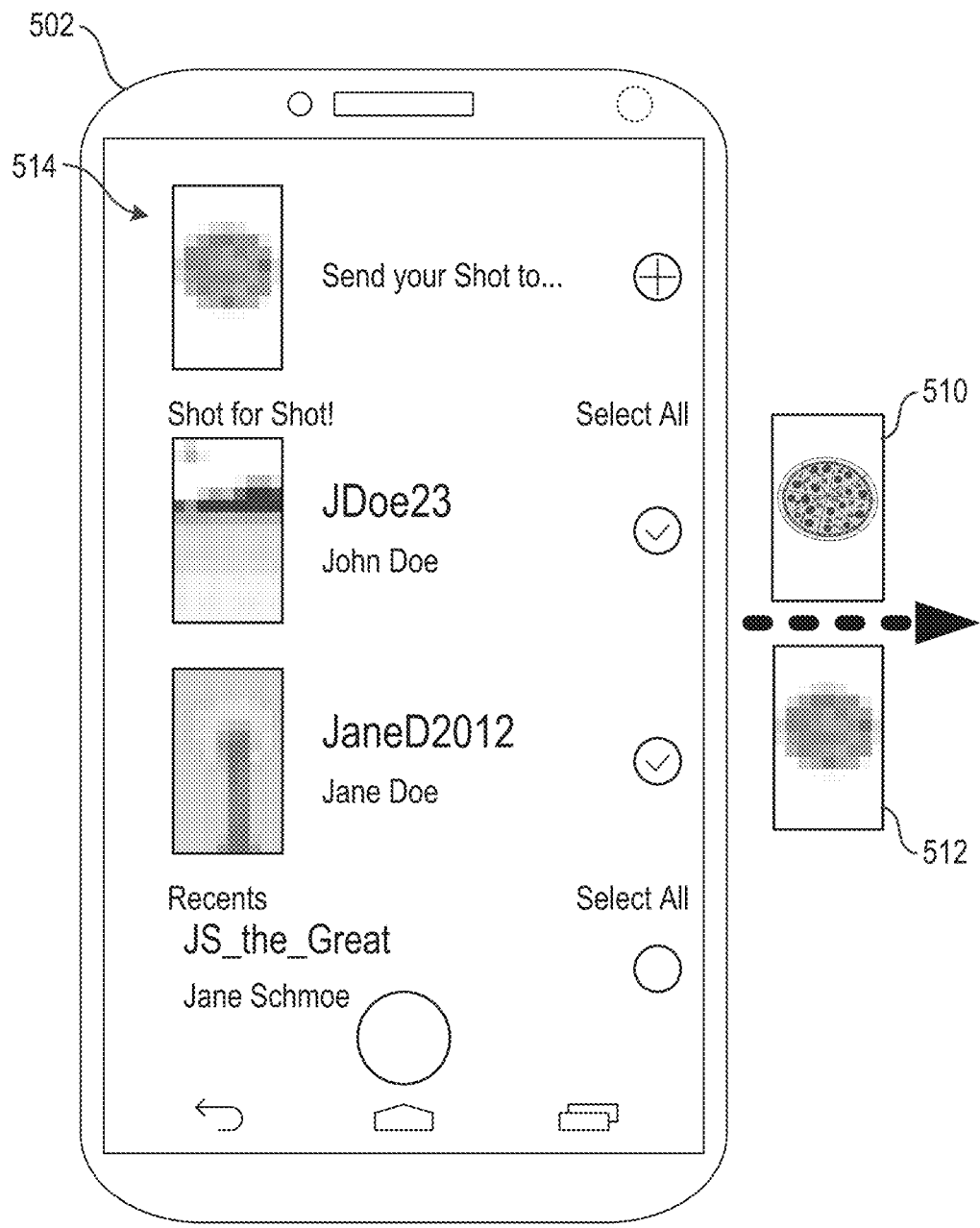
FIG. 5 illustrates an example computing device configured to provide for interactively exchanging media content, according to an embodiment of the present disclosure.

FIG. 5 illustrates an example computing device 502 (e.g., computer system 1000 in FIG. 10) configured to provide for interactively exchanging media content, according to an embodiment of the present disclosure. Subsequent to acquiring (e.g., capturing) an unobscured version 510 of a media content item (e.g., full-resolution image 410 of pizza in FIG. 4), a user can select one or more recipients to whom to send a Shot 514, which can include the unobscured version 510 of the media content item as well as an obscured version 512 of the media content item. Again, the obscured version 512 can be generated based on applying one or more obscuring techniques (e.g., a pixilation algorithm) to the unobscured version 510.

As shown in the example of FIG. 5, the user of the computing device 502 can select recipients to whom to send the user's Shot 514. In some instances, the user might desire to gain full access to the outstanding Shots (e.g., access the unobscured versions of the media content items included with the outstanding Shots). Accordingly, the user can select to transmit his/her Shot 514 to those who sent the outstanding Shots to the user, such as John Doe and Jane Doe. In some instances, the user might desire to start or resume conversations with other contacts. As shown in the example of FIG. 5, there can be a Recents list including contacts with whom to potentially engage in conversations. The contacts can, for example, be listed in an order starting with those from whom the user of the computing device 502 had most recently received content to those from whom the user had least recently received content (or vice versa). Moreover, in some cases, the contacts can be listed based on when the user transmitted content to them.

In the example of FIG. 5, the user of the computing device 502 desires to view the unobscured versions of the media content items included with the outstanding Shots sent by John Doe and Jane Doe. As such, in this example, the user can select the recipients of his/her Shot 514 to include John Doe and Jane Doe. Upon sending the Shot 514, the user can immediately (or within an allowable time period) gain access to the unobscured versions of the media content items included with the Shots sent by John Doe and Jane Doe (see FIG. 6 and FIG. 7).

Similarly, John Doe and Jane Doe can each receive the user's Shot 514 and can access the obscured version 512 of the included media content item but not yet the unobscured version 510. In order for each of John Doe and Jane Doe to access the unobscured version 510, each must transmit another Shot back to the user. The process can repeat, resulting in users exchanging Shots for Shots.

Figure 6:
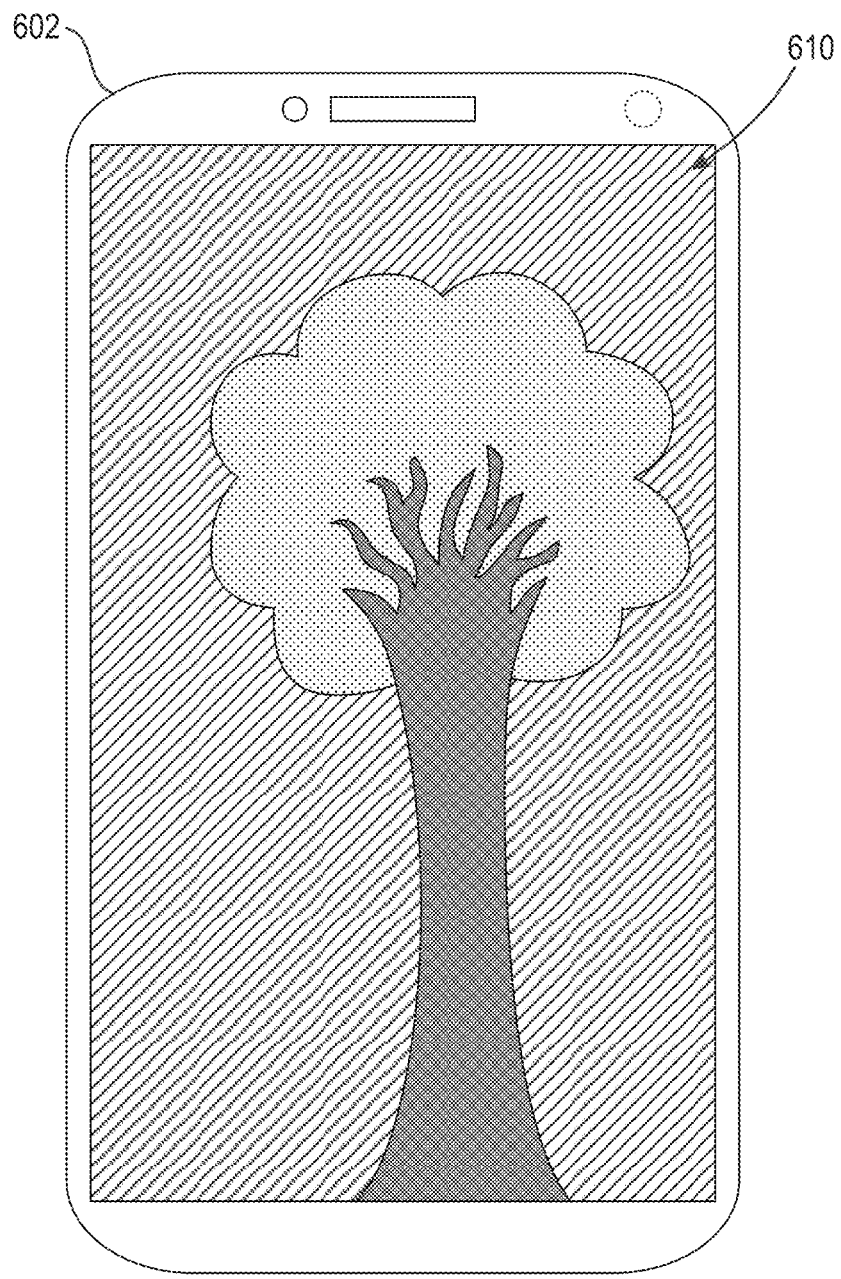
FIG. 6 illustrates an example computing device configured to provide for interactively exchanging media content, according to an embodiment of the present disclosure.

FIG. 6 illustrates an example computing device 602 (e.g., computer system 1000 in FIG. 10) configured to provide for interactively exchanging media content, according to an embodiment of the present disclosure. In the example of FIG. 6, a user of a computing device 602 has sent a Shot (e.g., Shot 514 in FIG. 5) to other users, such as John Doe and Jane Doe, who had previously sent the user a first Shot (e.g., the first outstanding Shot in FIG. 3) and a second Shot (e.g., the second outstanding Shot in FIG. 3). As such, the computing device 602 (or the interactive content exchange application running on the device 602) can immediately, or within an allowable time period, provide the user with access to unobscured versions of media content items included with the first Shot from John Doe and with the second Shot from Jane Doe. In the example of FIG. 6, access to the unobscured versions can be sorted from least recently received to most recently received. As such, between the first Shot and the second Shot, the user can first be provided with access to the unobscured (e.g., full-resolution, unpixelated, etc.) version of the media content item included with the second Shot (e.g., the second outstanding Shot in FIG. 3) from Jane Doe.

Figure 7:
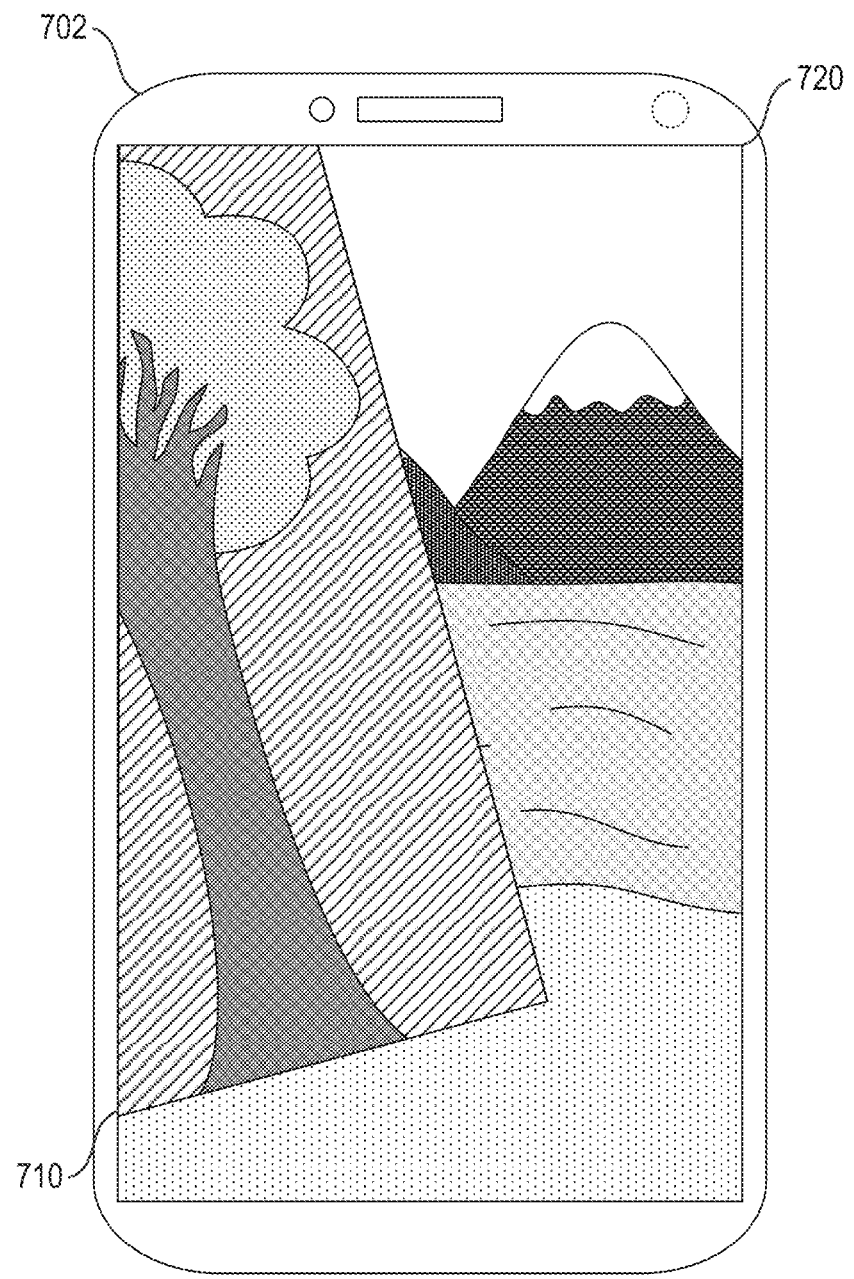
FIG. 7 illustrates an example computing device configured to provide for interactively exchanging media content, according to an embodiment of the present disclosure.

FIG. 7 illustrates an example computing device 702 (e.g., computer system 1000 in FIG. 10) configured to provide for interactively exchanging media content, according to an embodiment of the present disclosure. In some embodiments, when access to unobscured versions of multiple content items is provided, the multiple unobscured versions can be ordered, for example, from least recently received to most recently received (or vice versa). In some embodiments, the multiple unobscured versions can be presented in a virtual stack. For example, each unobscured version of a respective media content item can be presented as a displayed representation in a respective (virtual) layer of the virtual stack.

As discussed above, a user can gain access to unobscured versions of media content items included with a first Shot from John Doe and a second Shot from Jane Doe. In the example of FIG. 7, the unobscured version 710 of the media content item (e.g., image of tree) from Jane Doe can be presented as a displayed representation in a first (upper) layer of a virtual stack, while the unobscured version 720 of the media content item (e.g., image of scenery) from John Doe can be presented as a displayed representation in a second (lower) layer of the virtual stack.

Continuing with the example, the computing device 702 (or the interactive content exchange application running on the computing device 702) can receive a user interaction to move the displayed representation of the unobscured version 710 from Jane Doe. The user interaction can cause the displayed representation of the unobscured version 710 to move based on one or more movements associated with the user interaction (e.g., touch-based dragging). As shown in FIG. 7, when the displayed representation of the unobscured version 710 is moved, a displayed representation of the unobscured version 720 from John Doe can be revealed in the (virtual) layer below.

Furthermore, in some implementations, the one or more movements can be associated with at least one of a flicking gesture, a swiping gesture, a throwing gesture, or a tossing gesture. In some cases, the displayed representation of Jane Doe's unobscured version 710 in the first layer can moved off the display screen of the computing device 702, and an instance of Jane Doe's unobscured version 710 can be permanently removed from the computing device 702 (e.g., the second Shot from Jane Doe is no longer considered outstanding and can be deleted). Further, the displayed representation of the unobscured version 720 from John Doe can be presented on the display screen in full view. Accordingly, in some embodiments, an unobscured version in the next layer of the virtual stack can only be accessible in full view when the unobscured version in the current (e.g., topmost) layer is swiped away or removed (which can result in a permanent deletion of the associated Shot).

In some embodiments, there can be one or more animations for a displayed representation of an unobscured version of a media content item when being swiped away or removed. In some embodiments, after the user swipes away all accessible or available unobscured versions of media content items in the virtual stack, the computing device 702 can provide the camera mode (e.g., including a view of whatever imagery the camera currently "sees" or detects).

Again, it should be understood that, in some embodiments, the order of unobscured versions to be presented in the virtual stack can be changed, switched, and/or reversed (e.g., most recently received on the top of the virtual stack and least recently received on the bottom of the virtual stack).

Figure 8A:
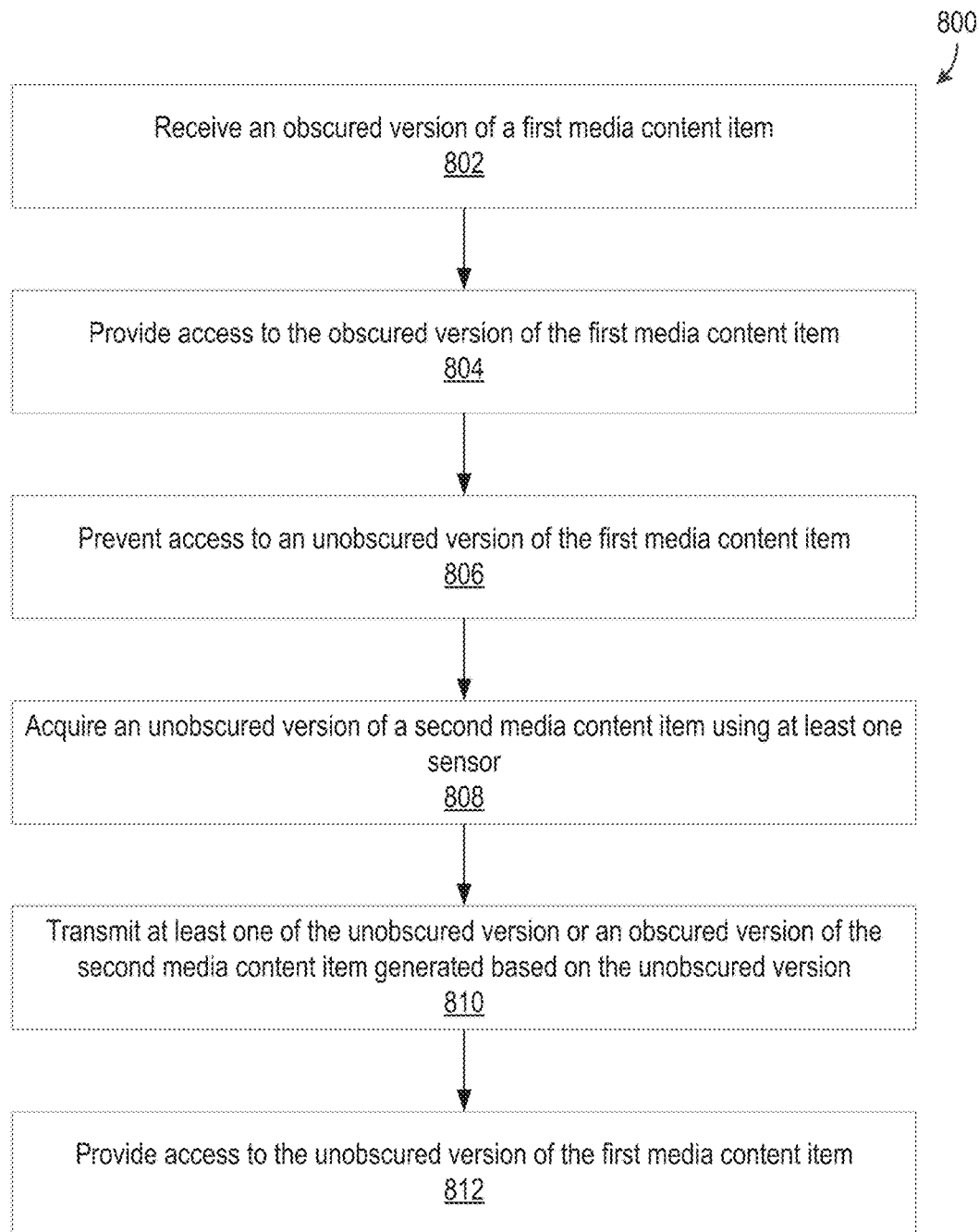
FIG. 8A illustrates an example method for interactively exchanging media content, according to an embodiment of the present disclosure.

FIG. 8A illustrates an example method 800 for interactively exchanging media content, according to an embodiment of the present disclosure. It should be appreciated that there can be additional, fewer, or alternative steps performed in similar or alternative orders, or in parallel, within the scope of the various embodiments unless otherwise stated.

At step 802, the example method 800 can receive, by a first computing system (or device), an obscured version of a first media content item from a second computing system. Step 804 can include providing, by the first computing system, access to the obscured version of the first media content item.

Step 806 can include preventing, by the first computing system, access to an unobscured version of the first media content item. At step 808, an unobscured version of a second media content item can be acquired, by the first computing system, using at least one sensor of the first computing system.

Step 810 can include transmitting to the second computing system, by the first computing system, at least one of the unobscured version of the second media content item or an obscured version of the second media content item generated based on the unobscured version of the second media content item. In some implementations, the obscured version of the second media content item can be generated by the first computing system, the second computing system, a media server, etc., and/or any combination thereof. In some instances, the obscured version of the second media content item can be transmitted first and the unobscured version of the second media content item can be transmitted at a subsequent time. In some cases, the first computing system can transmit just the unobscured version of the second media content item, such that the media server and/or the second computing system can generate the obscured version of the second media content item based on the unobscured version of the second media content item.

Step 812 can include providing, by the first computing system, access to the unobscured version of the first media content item. In some embodiments, providing access to the unobscured version of the first media content item can include presenting the unobscured version of the first media content item over time. For example, if the first media content item corresponds to a video, then the video can be played continuously such as in a playback loop or repeated manner (e.g., until swiped away, removed, device screen-lock enabled, and/or device screen-saver enabled, etc.).

Figure 8B:
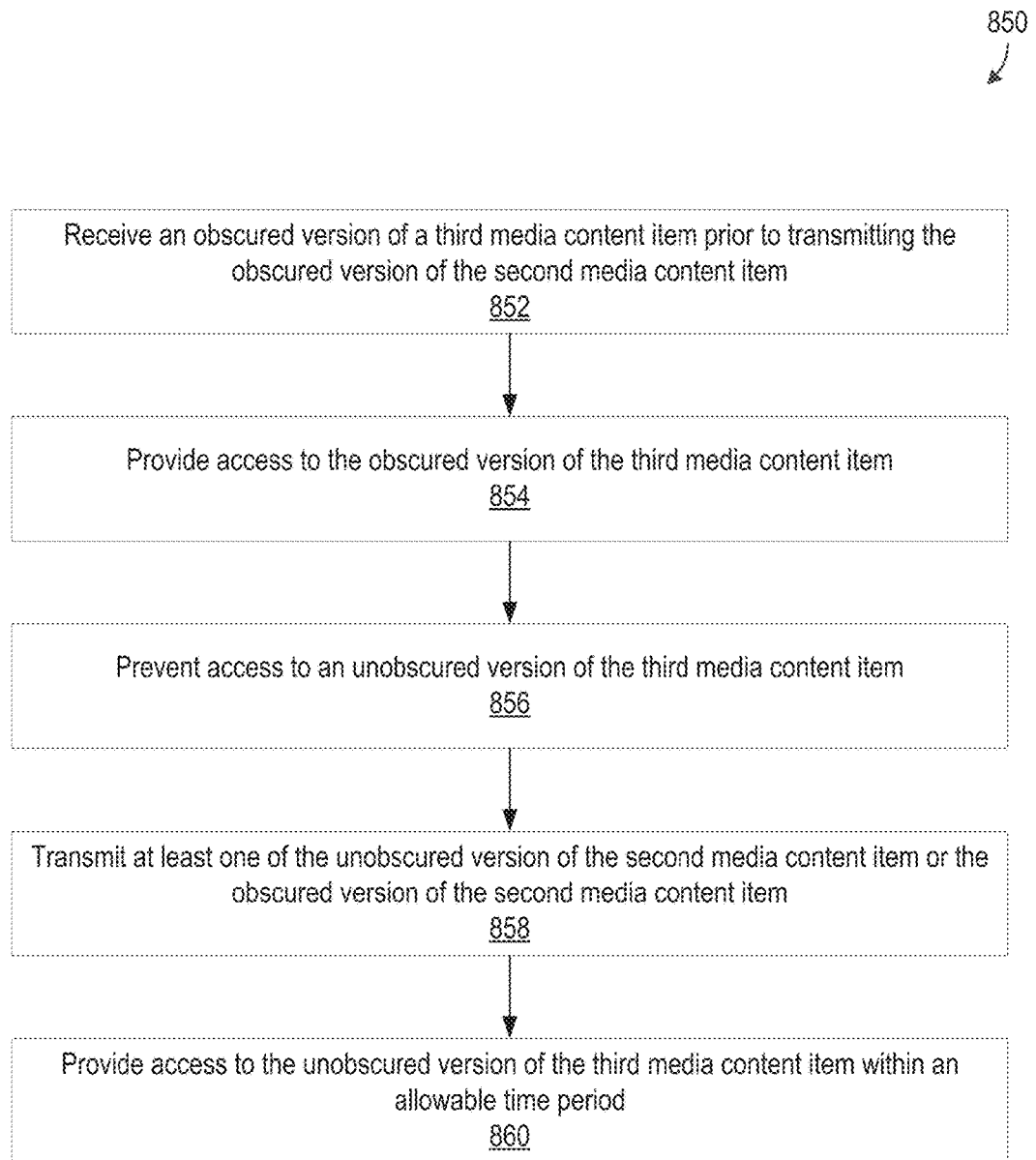
FIG. 8B illustrates an example method for interactively exchanging media content, according to an embodiment of the present disclosure.

FIG. 8B illustrates an example method 850 for interactively exchanging media content, according to an embodiment of the present disclosure. Again, it should be appreciated that there can be additional, fewer, or alternative steps performed in similar or alternative orders, or in parallel, within the scope of the various embodiments unless otherwise stated.

The example method 850 can receive, by the first computing system, an obscured version of a third media content item from a third computing system prior to transmitting the obscured version of the second media content item to the second computing system, at step 852. Step 854 can include providing, by the first computing system, access to the obscured version of the third media content item.

The first computing system can prevent access to an unobscured version of the third media content item, at step 856. At step 858, the first computing system can transmit to the third computing system at least one of the unobscured version of the second media content item or the obscured version of the second media content item. Step 860 can include providing access to the unobscured version of the third media content item within an allowable time period from when the at least one of the unobscured version of the second media content item or the obscured version of the second media content item is transmitted to the third computing system.

Various other embodiments, implementations, utilizations, and/or applications associated with interactively exchanging media content can be possible. In some instances, media content can be interactively exchanged in a "round robin" manner. In one example, a "round robin" group can include User A, User B, and User C. User A can send a first Shot to User B. In order for User B to fully access the first Shot (e.g., view the unobscured media content item included with the first Shot), User B can send a second Shot to User C. In order for User C to fully access the second Shot, User C can send a third Shot to User A, and so forth.

In some embodiments, media content can be interactively exchanged among groups. For example, a first group can be associated with a first set of computing systems and a second group can be associated with a second set of computing systems. In this example, one or more members of the first group can send a first Shot(s) to one or more members of the second group. All members of the second group can fully access the first Shot(s) when at least one member of the second group sends a second Shot(s) back to at least one member of the first group. In some cases, the first and second groups can correspond to different families, corporations, or organizations.

In some implementations, if a first user receives multiple Shots from a second user, the first user can fully access the multiple Shots when the first user sends at least one Shot back to the second user. In some instances, if the first users receives Shots from multiple users, then the first user can fully access the Shots when the first user sends at least one Shot back to the multiple users.

In some embodiments, the user can create an account to utilize the interactive content exchange component. In one example, the user can create the account using a phone number, a name, a username, etc., and/or any combination thereof. In another example, the user can create the account based on an existing account with a third party entity (e.g., a social networking service, a social media service, a forum service, etc.). In some implementations, there can be an authentication or verification step based on a SMS communication.

In some embodiments, a first user can transmit or receive Shots to and from at least one second user not currently included in the first user's contact list or address book. In one example, the first user can exchange Shots with the general public. In another example, the first user can exchange Shots with a machine-selected (e.g., random) user.

In some embodiments, the user can manage saving features for Shots transmitted and/or received. For example, the user can elect to only save Shots that he or she transmits.

In some cases, various embodiments of the present disclosure can be implemented as software, hardware, and/or any combination thereof. For example, various embodiments of the present disclosure can be implemented in association with one or more applications to be installed and run on one or more computing devices (and/or systems).

It is further contemplated that there can be many other uses, applications, implementations, and/or variations associated with the various embodiments of the present disclosure.

Social Networking System—Example Implementation

Figure 9:
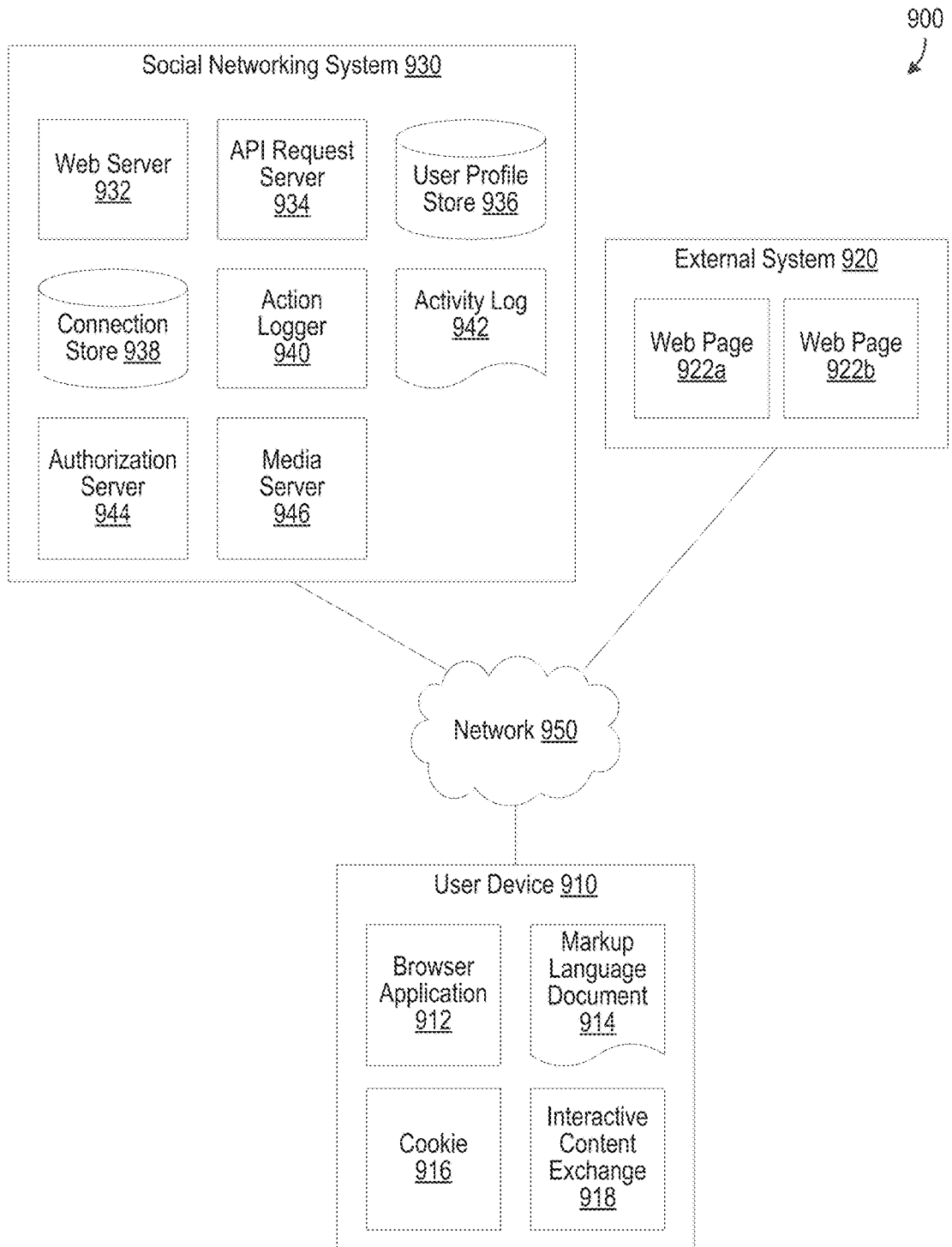
FIG. 9 illustrates a network diagram of an example system that can be utilized in various scenarios, according to an embodiment of the present disclosure.

FIG. 9 illustrates a network diagram of an example system 900 that can be utilized in various embodiments for enhanced video encoding, in accordance with an embodiment of the present disclosure. The system 900 includes one or more user devices 910, one or more external systems 920, a social networking system 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

The social networking system 930 can include a media server 946. In some embodiments, the media server 946 can be implemented as the media server 110 of FIG. 1. The media server 946 can be configured to facilitate interactively exchanging media content. For example, the media server 946 can be configured to relay information among one or more computing devices (e.g., user device 910, computer system 1000 in FIG. 10) engaging in interactive exchange of media content. Moreover, in some embodiments, the user device 910 can comprise an interactive content exchange component 918. The interactive content exchange component 918 can be configured to facilitate various operations associated with interactively exchanging media content. For example, the interactive content exchange component 918 can correspond to the interactive content exchange applications 129 and 139 of FIG. 1A and FIG. 1B.

Hardware Implementation

Figure 10:
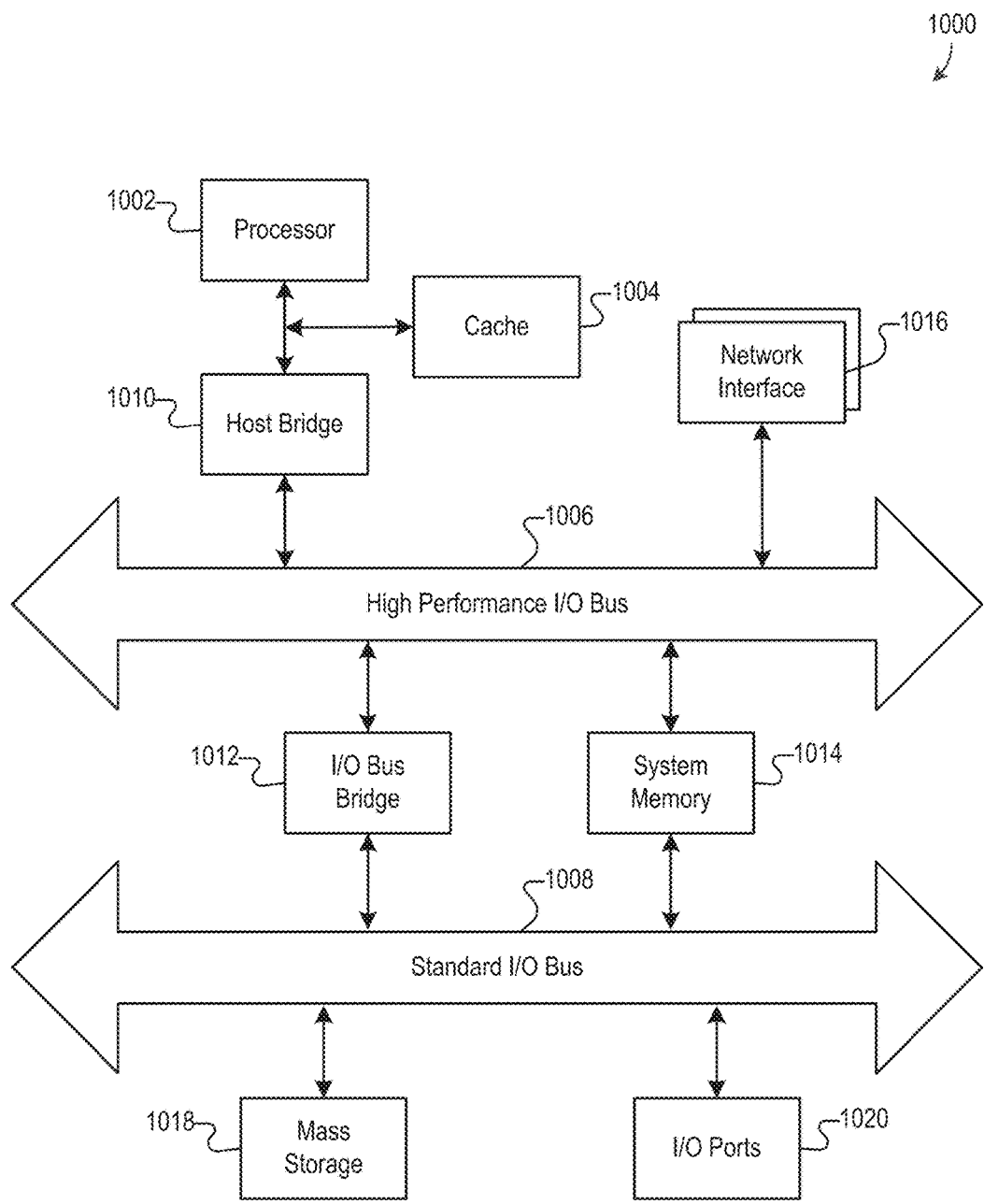
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 1030, the user device 910, and the external system 1020, or a component thereof. In an embodiment of the invention, the computer system 1000 may be one server among many that constitutes all or part of the social networking system 1030.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Furthermore, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to one embodiment", an embodiment", "other embodiments", one series of embodiments", some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer-implemented method comprising:
   receiving, by a first computing system, an obscured version and an unobscured version of a first media content item from a second computing system, wherein the obscured version of the first media content item includes at least one blurred image;
   preventing, by the first computing system, access to the unobscured version of the first media content item;
   transmitting to a third computing system, by the first computing system, at least one of an obscured version and an unobscured version of a second media content item; and
   providing, by the first computing system, access to the unobscured version of the first media content item in response to transmission of the at least one of the obscured version and the unobscured version of the second media content item to the third computing system, wherein each of the first media content item and the second media content item includes at least one of an image and a video.

2. The computer-implemented method of claim 1, wherein the at least one of the obscured version and the unobscured version of the second media content item is acquired by a camera of the first computing system.

3. The computer-implemented method of claim 1, wherein the unobscured version of the first media content item is received by the first computing system within an allowable time period from when the obscured version of the first media content item is received.

4. The computer-implemented method of claim 1, further comprising:
   providing, by the first computing system, access to the obscured version of the first media content item.

5. The computer-implemented method of claim 1, wherein providing access to the obscured version of the first media content item includes providing access to data associated with the first media content item, the data associated with the first media content including at least one of a caption, a tag, a property, metadata, and contextual information.

6. The computer-implemented method of claim 1, wherein providing access to the unobscured version of the first media content item is performed within an allowable time period from when the at least one of the obscured version and the unobscured version of the second media content item is transmitted to the third computing system.

7. The computer-implemented method of claim 1, wherein access to the unobscured version of the second media content item is provided by the third computing system based on transmission of a third media content item by the third computing system to the second computing system.

8. The computer-implemented method of claim 1, wherein providing access to the unobscured version of the first media content item includes presenting in a first layer of a virtual stack a displayed representation of the unobscured version of the first media content item on a display screen of the first computing system.

9. The computer-implemented method of claim 8, further comprising:
   receiving at least one user interaction to move the displayed representation of the unobscured version of the first media content item presented in the first layer; and
   moving the displayed representation of the unobscured version of the first media content item based on the at least one user interaction.

10. A first computing system comprising:
    at least one processor; and
    a memory storing instructions that, when executed by the at least one processor, cause the first computing system to perform:
    receiving, by the first computing system, an obscured version and an unobscured version of a first media content item from a second computing system, wherein the obscured version of the first media content item includes at least one blurred image;
    preventing, by the first computing system, access to the unobscured version of the first media content item;
    transmitting to a third computing system, by the first computing system, at least one of an obscured version and an unobscured version of a second media content item; and
    providing, by the first computing system, access to the unobscured version of the first media content item in response to transmission of the at least one of the obscured version and the unobscured version of the second media content item to the third computing system, wherein each of the first media content item and the second media content item includes at least one of an image and a video.

11. The first computing system of claim 10, wherein the at least one of the obscured version and the unobscured version of the second media content item is acquired by a camera of the first computing system.

12. The first computing system of claim 10, wherein the unobscured version of the first media content item is received by the first computing system within an allowable time period from when the obscured version of the first media content item is received.

13. The first computing system of claim 10, wherein the instructions, when executed by the at least one processor, cause the system to further perform:
   providing, by the first computing system, access to the obscured version of the first media content item.

14. A non-transitory computer-readable storage medium including instructions that, when executed by at least one processor of a first computing system, cause the first computing system to perform a method comprising:
   receiving, by the first computing system, an obscured version and an unobscured version of a first media content item from a second computing system, wherein the obscured version of the first media content item includes at least one blurred image;
   preventing, by the first computing system, access to the unobscured version of the first media content item;
   transmitting to a third computing system, by the first computing system, at least one of an obscured version and an unobscured version of a second media content item; and
   providing, by the first computing system, access to the unobscured version of the first media content item in response to transmission of the at least one of the obscured version and the unobscured version of the second media content item to the third computing system, wherein each of the first media content item and the second media content item includes at least one of an image and a video.

15. The non-transitory computer-readable storage medium of claim 14, wherein the at least one of the obscured version and the unobscured version of the second media content item is acquired by a camera of the first computing system.

16. The non-transitory computer-readable storage medium of claim 14, wherein the unobscured version of the first media content item is received by the first computing system within an allowable time period from when the obscured version of the first media content item is received.

17. The non-transitory computer-readable storage medium of claim 14, further comprising:
   providing, by the first computing system, access to the obscured version of the first media content item.

* * * * *